(12) United States Patent
Lin

(10) Patent No.: US 10,086,547 B2
(45) Date of Patent: Oct. 2, 2018

(54) MOLDING SYSTEM AND METHOD FOR DIRECTLY GAS-COOLING A MOLDING OBJECT

(71) Applicant: Quanta Computer Inc., Taoyuan (TW)

(72) Inventor: Shu-Chen Lin, Taoyuan (TW)

(73) Assignee: Quanta Computer Inc., Taoyuan City (TW)

( * ) Notice: Subject to any disclaimer, the term of this patent is extended or adjusted under 35 U.S.C. 154(b) by 640 days.

(21) Appl. No.: 14/619,643

(22) Filed: Feb. 11, 2015

(65) Prior Publication Data
US 2016/0107357 A1    Apr. 21, 2016

(30) Foreign Application Priority Data
Oct. 17, 2014   (TW) .............................. 103135997 A

(51) Int. Cl.
*B29C 45/73*   (2006.01)
*B29C 33/02*   (2006.01)
*B29C 33/04*   (2006.01)

(52) U.S. Cl.
CPC .............. *B29C 45/73* (2013.01); *B29C 33/02* (2013.01); *B29C 33/046* (2013.01); *B29C 45/7337* (2013.01); *B29C 2045/7368* (2013.01); *B29C 2045/7387* (2013.01); *B29C 2045/7393* (2013.01)

(58) Field of Classification Search
CPC .... B29C 2045/7387; B29C 2045/7393; B29C 2045/7368; B29C 45/7337; B29C 33/046; B29C 33/304; B29C 33/306
See application file for complete search history.

(56) References Cited

U.S. PATENT DOCUMENTS

| 4,139,177 A | * | 2/1979 | Hanning | ................. | B29C 35/16 249/141 |
| 4,177,238 A | * | 12/1979 | Allen | ................... | B29C 35/007 264/328.16 |
| 4,205,950 A | * | 6/1980 | Suss | ........................ | B29C 35/16 264/237 |

(Continued)

FOREIGN PATENT DOCUMENTS

| CN | 201143761 Y | 11/2008 |
| CN | 202846816 U | 4/2013 |

(Continued)

OTHER PUBLICATIONS

Machine translation of Japanese Patent Publication No. JP-10202662A, originally published Aug. 1998, 7 pages (Year: 1988).*

*Primary Examiner* — William P Bell
(74) *Attorney, Agent, or Firm* — Rabin & Berdo, P.C.

(57) ABSTRACT

A molding system for directly gas-cooling a molding object includes a cold air provider, two molding parts, a plurality of outlets, at least one air-providing molding part, at least one air passage, and a controller. The two molding parts are closed detachably to co-define a forming cavity therebetween. The outlets are arranged on the air-providing molding part. The air passage is connected to the cold air provider and the outlets. The controller drives the cold air provider to provide cold air to a molding object in the forming cavity directly when the two molding parts are separating.

12 Claims, 9 Drawing Sheets

(56) References Cited

U.S. PATENT DOCUMENTS

| | | | | |
|---|---|---|---|---|
| 4,976,900 A | * | 12/1990 | Tsutsumi | B29C 35/16 264/328.14 |
| 2003/0146552 A1 | * | 8/2003 | Escribano Andres | B29C 33/3814 264/572 |
| 2010/0040719 A1 | * | 2/2010 | Lin | B29C 33/04 425/144 |

FOREIGN PATENT DOCUMENTS

| | | | | | |
|---|---|---|---|---|---|
| EP | 1870218 A1 | * | 12/2007 | | B29C 35/16 |
| JP | 06198670 A | * | 7/1994 | | B29C 45/16 |
| JP | 10202662 A | * | 8/1998 | | B29C 45/1703 |

* cited by examiner

MOLDING SYSTEM AND METHOD FOR DIRECTLY GAS-COOLING A MOLDING OBJECT

RELATED APPLICATIONS

This application claims priority to Taiwan Application Serial Number 103135997, filed Oct. 17, 2014, which is herein incorporated by reference.

BACKGROUND

Field of Invention

The present invention relates to a molding system and method. More particularly, the present invention relates to a molding system and method for directly gas-cooling a molding object.

Description of Related Art

The traditional plastic injection molding process comprises the following steps: at first, the plastic material is fed into the feeding tube of the injection molding machine to plasticize the plastic material into molten resin and then the following steps in sequence. The forming mold is closed, the molten resin is injected into the cavity of the forming mold, pressure is held by the injection molding machine, the forming mold is cooled circularly, the forming mold is opened, the finished product is knocked out, and then the finished product is output. Another traditional thermoforming process comprises the steps as follows: the material (composite material) is first placed into the mold and is heated by raising the temperature continuously followed by closing the mold, increasing pressure, cooling, releasing pressure, opening the mold in sequence, and then the finished product is output.

The traditional mold cooling method is to dispose a plurality of circulating pipelines in which water or oil acts as a medium inside the mold. The water or oil circulates in the interior of the mold through a mold temperature controller so as to heat or cool the mold. One of the methods to achieve the circular cooling step of the forming mold is to use cooling water as a cooling medium so as to cool the forming mold. In greater detail, circulation water channels are buried in the forming mold body so that cooling water flows circularly in the forming mold body along the circulation water channels through the mold temperature controller. In this manner, heat of the forming mold is carried away, and heat energy of the finished product inside the forming mold is therefore carried away indirectly.

However, utilizing cooling water as a cooling medium to cool the forming mold has the following disadvantages. First, in order to ensure that the cooling water can flow circularly in the forming mold, vendors are required to additionally provide relevant equipment, such as a pump, a fan motor of cooling tower, a mold temperature controller. In addition, since the heat energy in the mold core needs to be carried away indirectly through such equipment and the water channels buried in the mold core, not only is the cooling efficiency poor to lengthen the cooling time, but the entire molding cycle of the finished product is also lengthened, thus affecting production efficiency.

In addition, when cooling water flows circularly in the forming mold for a long time, the cooling water may generate scales having a specific thickness on inner walls of the circulation water channels. The scales isolate the cooling water from the inner walls of the circulation water channels that leads to decline in cooling performance. In additional to that, when the cooling water at a low temperature flows circularly in the forming mold, condensed water droplets will be generated on the inner surface of the cavity of the forming mold due to the low-temperature cooling water, thus affecting the molding quality of the finished product.

For the forgoing reasons, there is a need to resolve the above-mentioned inconveniences and shortcomings by providing a molding system and method for directly gas-cooling a molding object, which is also an objective that the relevant industry is eager to achieve.

SUMMARY

One aspect of the present invention is to provide a molding system and method for directly gas-cooling a molding object to resolve the above-mentioned inconveniences and shortcomings. That is, by blowing cold air towards the surface of the molding object and the surfaces of the mold cores of the forming mold directly when opening the mold, the entire molding cycle of the molding object is shortened.

A molding system for directly gas-cooling a molding object is provided. The molding system for directly gas-cooling the molding object comprises a cold air provider, two molding parts such as a male mold, a female mold, at least one air-providing molding part, at least one air passage, and a controller. The two molding parts (male mold and female mold) are closed detachably to define a forming cavity therebetween. The forming cavity is used forming a molding object in it. The air-providing molding part is located on at least one of the first molding part and the second molding part. The air-providing molding part has a plurality of outlets. The air passage connects the cold air provider and the outlets. The controller is electrically connected to the cold air provider. The controller drives the cold air provider to provide cold air to the molding object through the outlets after the molding object is formed in the forming cavity.

The invention provides a molding method for directly gas-cooling a molding object. The molding method for directly gas-cooling the molding object comprises the following steps: separating two molding parts such as a male mold, a female mold; inserting a high frequency induction heater between the two molding parts and heating inner surfaces of the two molding parts; closing the two molding parts; injecting a plastic material into a forming cavity to allow a molding object to be formed in the forming cavity; starting to separate the two molding parts and providing cold air to blow towards the molding object simultaneously when the molding object in the forming cavity just transforms into solid state.

In summary, the technical solution of the present invention has obvious advantages and beneficial effects as compared with the prior art. Through the above technical solution, considerable advances in technology and extensive industrial applicability can be achieved. The present invention at least has the following advantages:

1. production efficiency is improved;
2. energy cost and maintenance cost for production equipment are saved;
3. rapid heating/cooling being more energy-efficient are provided;
4. another choice for cooling a forming mold is provided when water is not suitable to be a cooling medium for the forming mold; and
5. the manufacturing cycle of the molding object by rapidly heating/cooling the surfaces of the mold cores is shorten.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE EMBODIMENTS

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically depicted in order to simplify the drawings.

Figure 1:
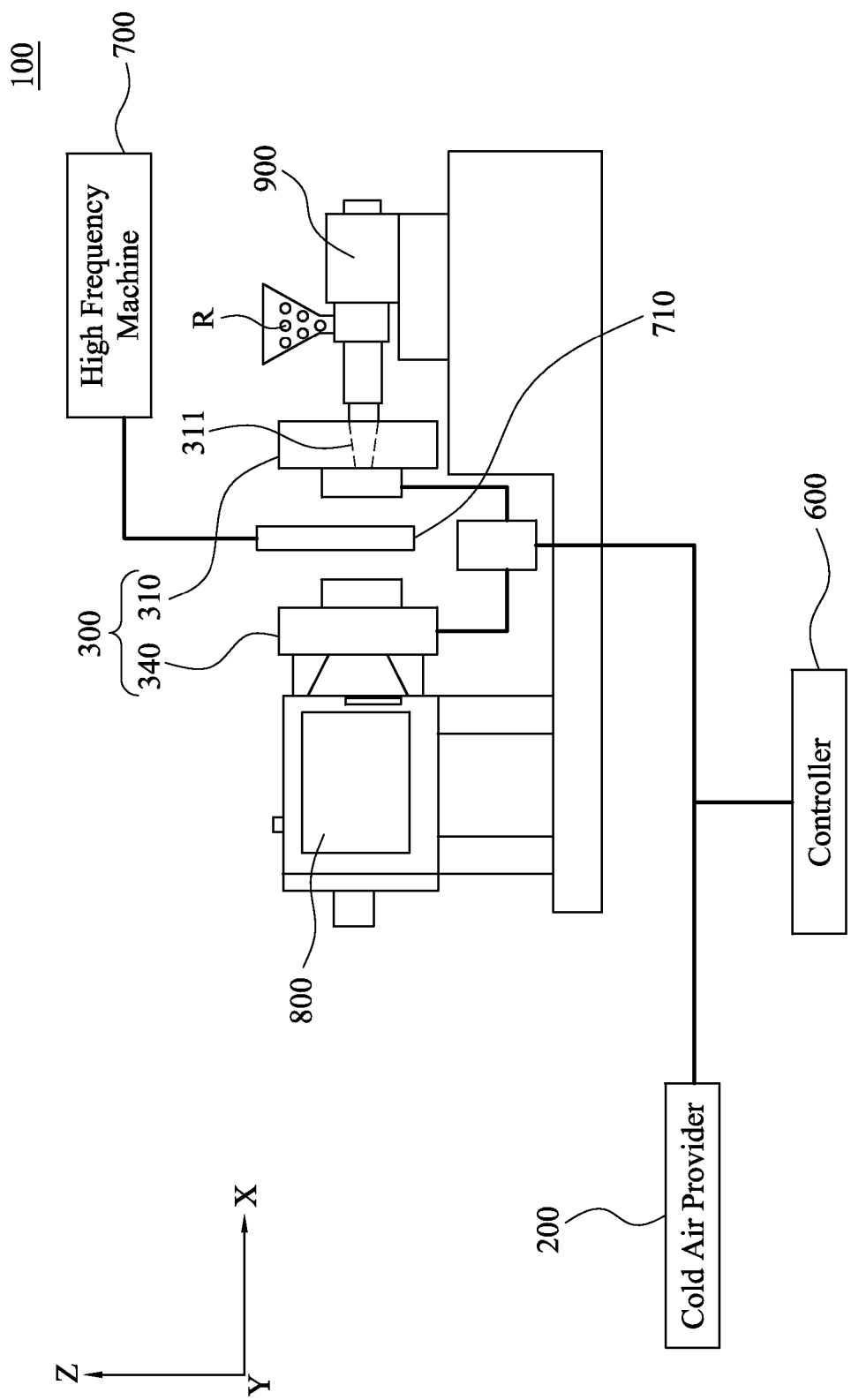
FIG. 1 depicts a schematic diagram of a molding system for directly gas-cooling a molding object according to one embodiment of this invention.

FIG. 1 depicts a schematic diagram of a molding system 100 for directly gas-cooling a molding object according to one embodiment of this invention. The molding system 100 comprises a cold air provider 200, a forming mold 300, a controller 600, a high frequency machine 700, a transmission device 800 of an injection molding machine, and a plastic injection unit 900 of the injection molding machine. The cold air provider 200 is connected to the controller 600 and the forming mold 300. The forming mold 300 is connected to the transmission device 800 and the plastic injection unit 900.

Figure 2:
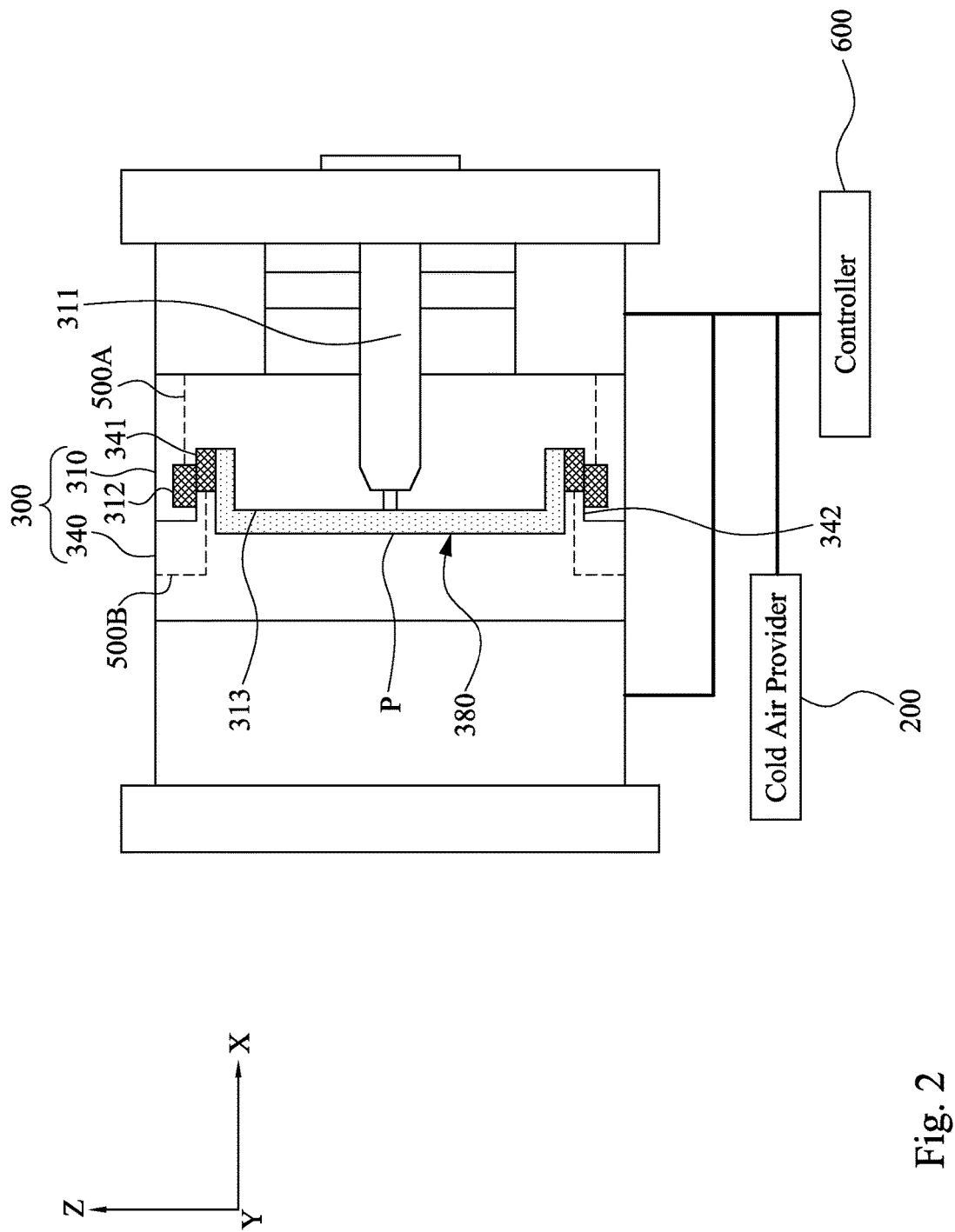
FIG. 2 depicts a partial schematic diagram of the forming mold in FIG. 1 when the forming mold is closed.
Figure 3:
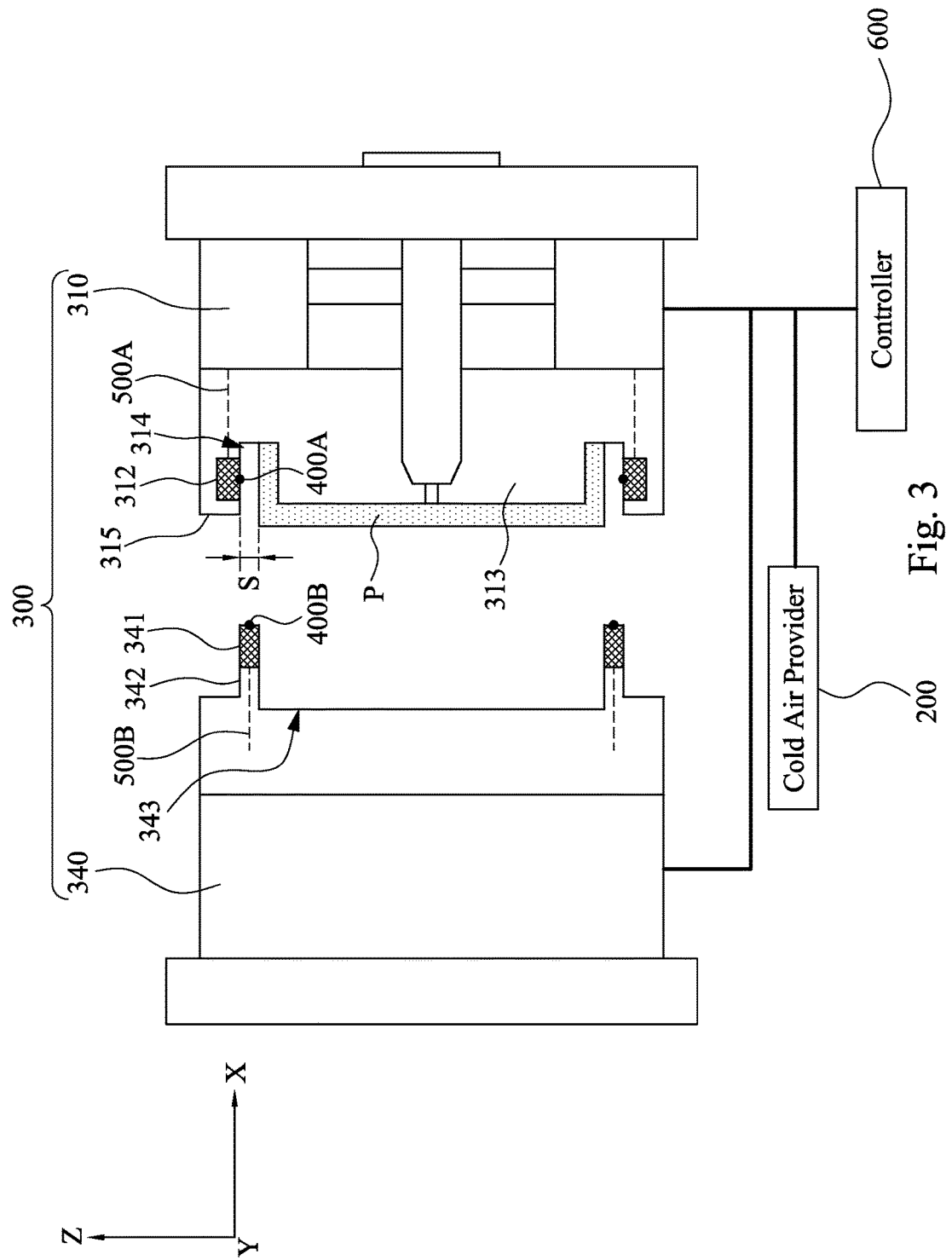
FIG. 3 depicts a partial schematic diagram of the forming mold in FIG. 1 when opening the forming mold.

FIG. 2 depicts a partial schematic diagram of the forming mold 300 in FIG. 1 when the forming mold is closed. FIG. 3 depicts a partial schematic diagram of the forming mold 300 in FIG. 1 when opening the forming mold. In the present embodiment, the forming mold 300 comprises a first molding part 310 and a second molding part 340. The first molding part 310 and the second molding part 340 can be opened or closed detachably. For example, the second molding part 340 and the first molding part 310 are closed along an axial direction (such as +X axis) to define a forming cavity 380 between the first molding part 310 and the second molding part 340. The forming cavity 380 is used for molding a molding object P therein, as shown in FIG. 2. Conversely, when the second molding part 340 is separated form the first molding part 310 along the axial direction (such as −X axis) to expose the molding object P as shown in FIG. 3, the forming mold 300 is in an open state. Therefore, no matter the forming mold 300 is in the open state or in a closed state, the controller 600 can at least drive the cold air provider 200 to provide cold air to the molding object P after the molding object P is formed in the forming cavity 380.

In one embodiment, the first molding part 310 is a male mold that comprises a first mold core 313 and a first recess 314. The first mold core 313 is located in the first recess 314. When the molding object P is formed in the forming cavity 380, the molding object P adheres to the first mold core 313. The second molding part 340 is a female mold that comprises a second mold core 342 and a second recess 343. The second mold core 342 surrounds the second recess 343 mentioned above. As shown in FIG. 2, when the forming mold 300 is in the closed state, the second mold core 342 extends into the first recess 314 and covers the first mold core 313 so that the first recess 314, the second recess 343, and the first mold core 313 co-define the above-mentioned forming cavity 380.

As shown in FIG. 1 and FIG. 2, the plastic injection unit 900 of the injection molding machine is connected to the first molding part 310 to inject a plastic material R (such as molten resin) into a space in the forming cavity 380 through a plastic passage 311 in the first molding part 310. The molten plastic material R is thus molded in the forming cavity 380 and further transforms into the solid molding object P.

Figure 4A:
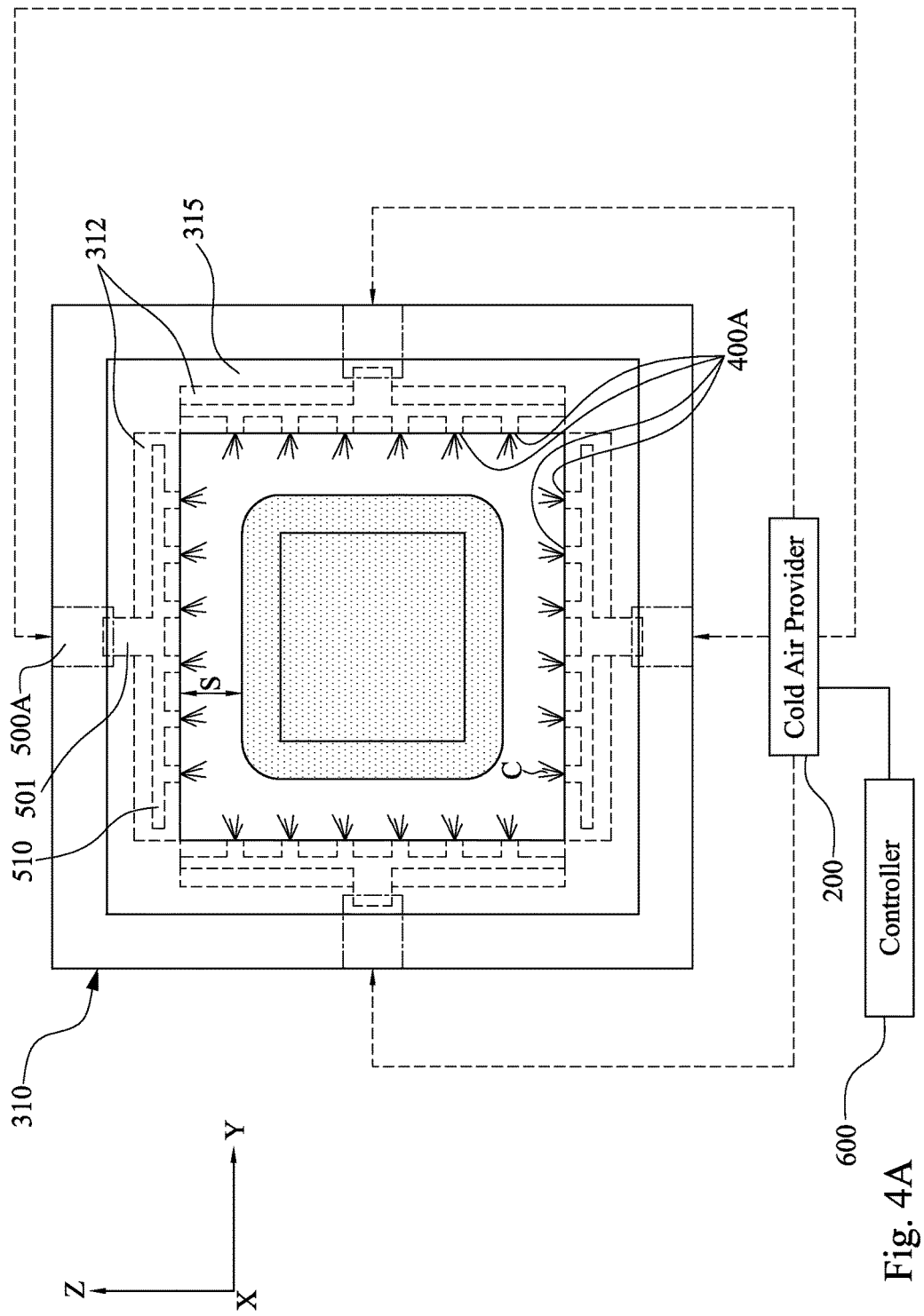
FIG. 4A depicts a front view of the first molding part in FIG. 2.

FIG. 4A depicts a front view of the first molding part 310 in FIG. 2. As shown in FIG. 3 and FIG. 4A, the first molding part 310 comprises a plurality of (such as four) first air passages 500A and a plurality of (such as four) first air-providing molding parts 312. Each of the first air passages 500A is connected to one of the first air-providing molding parts 312 through a joint 501. Each of the first air-providing molding parts 312 comprises a branch air passage 510 and a plurality of first outlets 400A. The first outlets 400A are formed on a surface of each of the first air-providing molding parts 312 facing the first mold core 313. In other words, the molding object P is surrounded by the four air-providing molding parts 312. Cold air from the first outlets 400A first flows into the first recess 314 and then directly blows towards the molding object P. In greater detail, the first outlets 400A have an axial direction (such as Z axis). The axial direction of the first outlets 400A is orthogonal to a closing direction that the first molding part 310 and the second molding part 340 are closed. The branch air passages 510 are respectively communicated with the first outlets 400a and the first air passage 500A correspondingly so that each of the first air passages 500A is communicated with the first recess 314 of the first molding part 310 through the branch air passage 510 of the first air-providing molding part 312 and the first outlets 400A. The first air passages 500A are hollow passages or tubes which are connected to the cold air provider 200 through external joints. When the forming mold 300 is in the closed state and the second mold core 342 extends into the first recess 314 and covers the first mold core 313, the second mold core 342 is located between the first outlets 400A and the first mold core 313 and blocks the communication between the first outlets 400A and the first recess 314. At this time, since the outlets 400A are all blocked, the molten plastic material R is molded in the forming cavity 380 and further transforms into the solid molding object P.

Hence, when the first molding part 310 starts to separate from the second molding part 340, the first outlets 400A are communicated with the first recess 314 because the second mold core 342 of the second molding part 340 exposes the first outlets 400A. At this time, the controller 600 can drive the cold air provider 200 to provide cold air C to blow towards the surfaces of the molding object P and the surfaces of the first mold core 313 of the forming mold 300 through the first air passages 500A, the branch air passages 510, and the first outlets 400A. In greater detail, when the first molding part 310 starts to separate from the second molding part 340, a gap S (that is the air gap S) is maintained between the first outlets 400A and the molding object P because the second mold core 342 of the second molding part 340 is moved away to expose the first outlets 400A. As a result, the cold air C is sprayed directly towards the surfaces of the molding object P and the surfaces of the mold core of the forming mold 300 through the gap S to reduce the temperature of the surface of the molding object P.

Figure 4B:
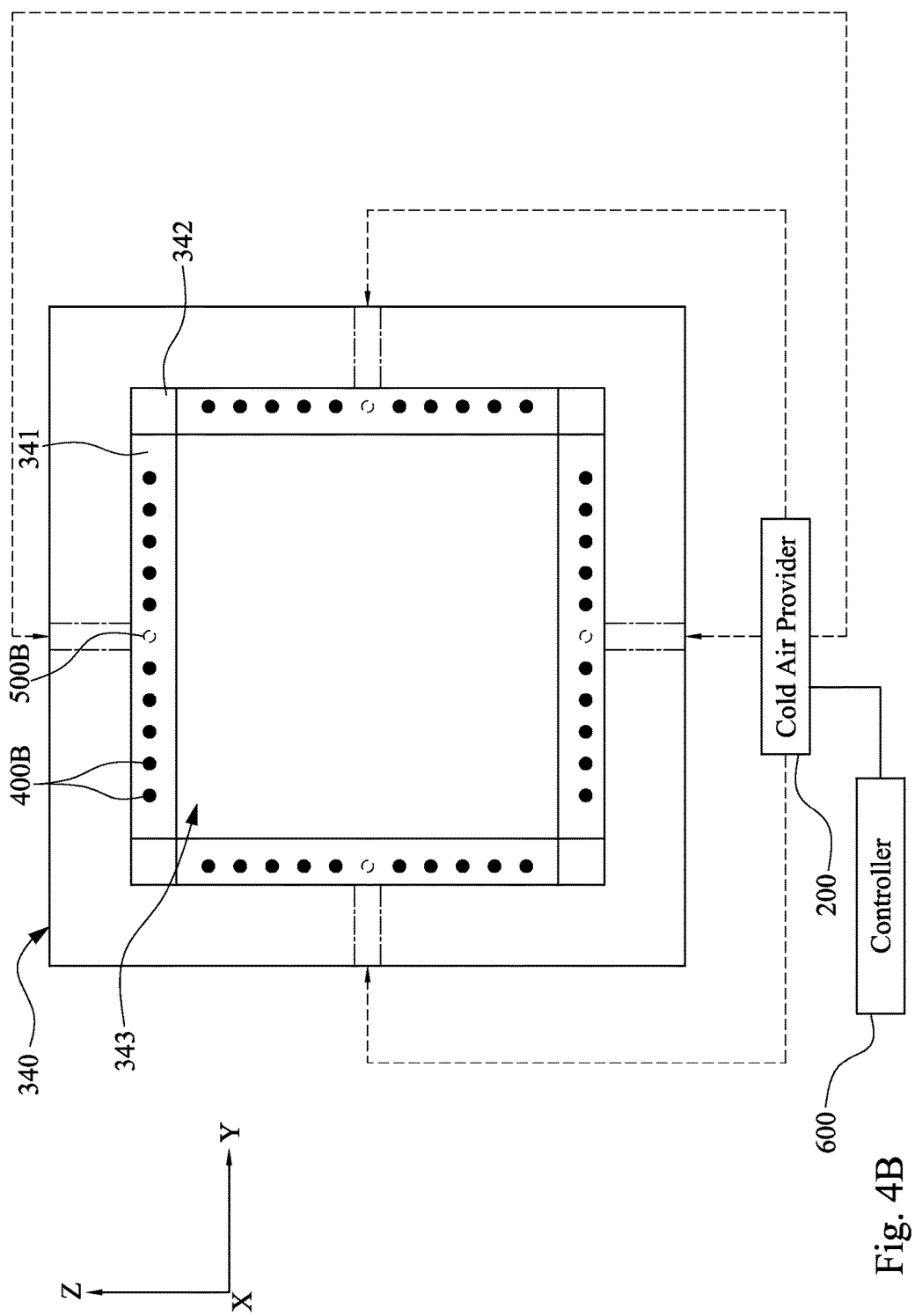
FIG. 4B depicts a front view of the second molding part in FIG. 2.

FIG. 4B depicts a front view of the second molding part in FIG. 2. As shown in FIG. 3 and FIG. 4B, the second molding part 340 comprises a plurality of second air passages 500B and second air-providing molding parts 341. The second air passages 500B are located in the second molding part 340. The second air-providing molding parts 341 are assembled to a surface of the second mold core 342 facing the first molding part 310. A plurality of second outlets 400B are formed on a surface of each of the second air-providing molding parts 341 facing the first molding part 310. In other words, the second outlets 400B have an axial direction (such as X axis). The axial direction of the second outlets 400B is in parallel with the closing direction that the first molding part 310 and the second molding part 340 are closed. Since the operations of the second air passages 500B, the second air-providing molding parts 341, and the second outlets 400B of the second molding part 340 are similar to the first molding part 310, a description in this regard is not provided.

Hence, the principle for cooling the molding object of the disclosure is not to cool the mold core steel through the cooling pipe lines in the mold and then cool the molding object P indirectly by way of heat conduction. Rather, cooling air is transmitted to the surface of the mold core through the air passages and the outlets of the first air-providing molding parts. By blowing cold air towards the surfaces of the molding object and the surface of mold core of the forming mold during the period between the forming mold being opened and the molding object being knocked out, the entire molding cycle of the molding object is effectively shortened to reduce heat loss, thus improving production efficiency.

In addition, as shown in FIG. 3 and FIG. 4A, the first air-providing molding parts 312 mutually surround the first mold core 313, and the first outlets 400A are arranged at an interval and also mutually surround the first mold core 313. In greater detail, the first molding part 310 further has a flange 315 in a shape of a square ring. The flange 315 surrounds the first mold core 313. The first air-providing molding parts 312 are located on a surface of the flange 315 facing the first mold core 313, such that the first air-providing molding parts 312 mutually surround the first mold core 313. Hence, since the first outlets 400A mutually surround the molding object P in the forming cavity 380, the first outlets 400A can evenly spray cold air C towards the surfaces of the molding object P and the surfaces of the first mold core 313 of the forming mold 300 to avoid deformation of the molding object P due to non-uniform cooling amplitudes in different regions of the molding object P.

In addition, as shown in FIG. 3 and FIG. 4B, the second air-providing molding parts 341 mutually surround the second recess 343, and the second outlets 400B are arranged at an interval and mutually surround the second recess 343. In greater detail, a flange of the second mold core 342 is in a shape of a square ring and protrudes towards one surface of the first molding part 310. The flange of the second mold core 342 surrounds the second recess 343. The second air-providing molding parts 341 are located on a surface of the flange of the second mold core 342 facing the first recess 314, such that the second air-providing molding parts 341 mutually surround the second recess 343. Hence, since the second outlets 400B mutually surround the second recess 343, the second outlets 400B can spray cold air C to surroundings of the molding object P close to the second molding part 340 when the forming mold 300 is in the open state to avoid deformation of the molding object P due to non-uniform cooling amplitudes in different regions of the molding object P.

In one embodiment, the first air-providing molding parts 312 are in a multi-piece form and are fastened to the first molding part 310 through bolts (not shown in the figure). However, the present invention is not limited in this regard. The first air-providing molding parts and the first molding part may be integrally formed.

Figure 5:
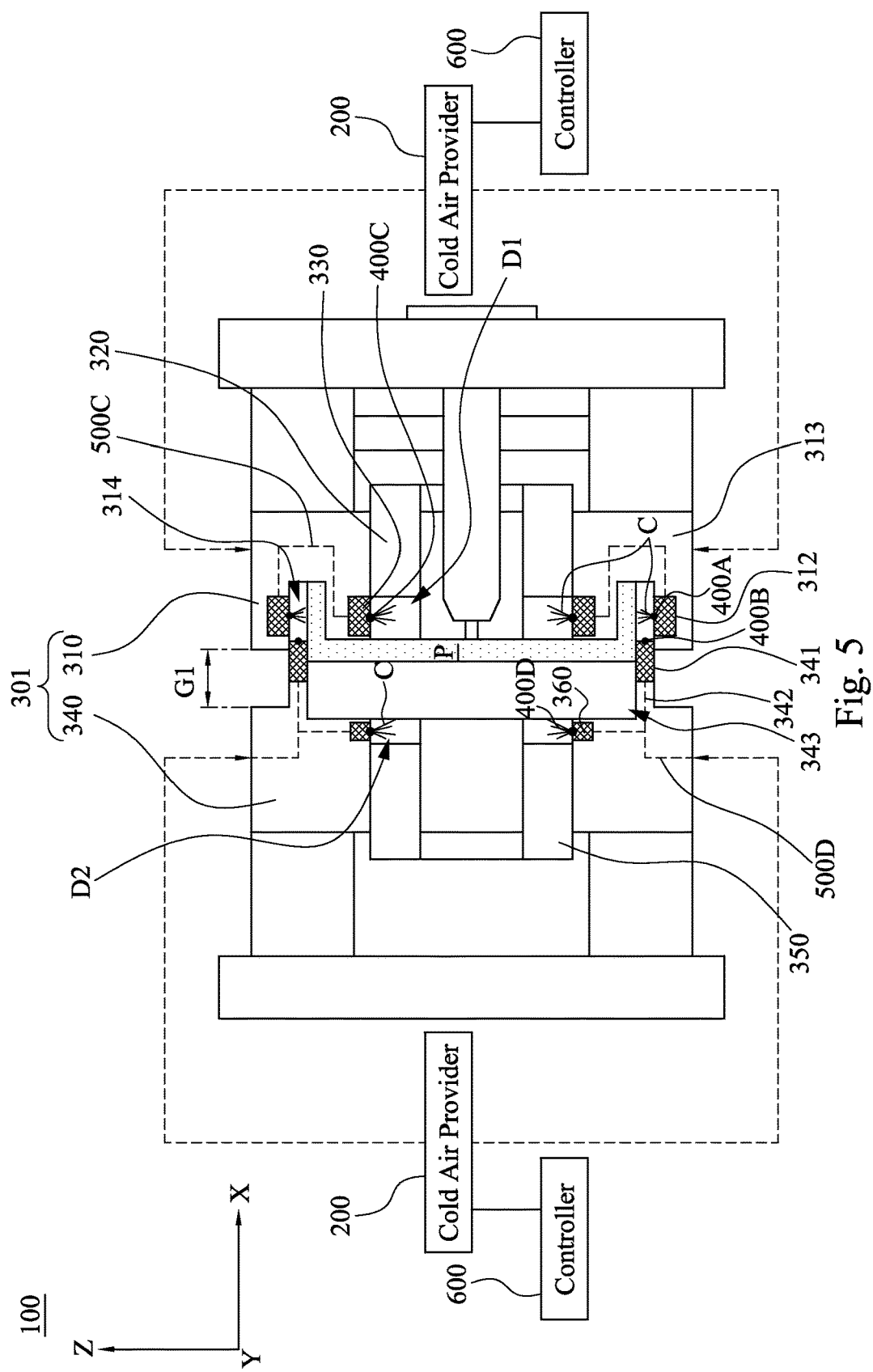
FIG. 5 depicts a cross-sectional view of a molding system at a first mold opening stage according to another embodiment of this invention.

FIG. 5 depicts a cross-sectional view of a molding system at a first mold opening stage according to another embodiment of this invention. The present embodiment molding system differs from the molding system in FIG. 3 in that the first molding part 310 comprises at least one first internal slide block 320. The first internal slide block 320 is slidably embedded in the first mold core 313. Hence, the first internal slide block 320 is able to slide back and forth towards the above-mentioned closing direction (such as X axis). The first internal slide block 320 forms a first sliding space D1 in the first mold core 313 after sliding. The first internal slide block 320 is driven by, for example, an ejector plate or a hydraulic cylinder. The first molding part 310 further comprises a plurality of third air-providing molding parts 330 and third air passages 500C. Each of the third air passages 500C is connected to one of the third air-providing molding parts 330 through a joint. The third air-providing molding parts 330 are located on a surface of the first mold core 313 facing the first sliding space D1. Each of the third air-providing molding parts 330 comprises a plurality of third outlets 400C. The third outlets 400C are arranged on a surface of the third air-providing molding part 330 facing the first sliding space D1. Thus, the third outlets 400C face the first sliding space D1. In other words, the third outlets 400C have an axial direction (such as Z axis). The axial direction of the third outlets 400C is orthogonal to the closing direction that the first molding part 310 and the second molding part 340 are closed.

The second molding part 340 comprises at least one second internal slide block 350. The second internal slide block 350 is slidably embedded in the second molding part 340. Hence, the second internal slide block 350 is able to slide back and forth towards the above-mentioned closing direction (such as X axis), and forms a second sliding space D2 in the second molding part 340 after sliding. The second internal slide block 350 is driven by, for example, an ejector plate or a hydraulic cylinder. The second molding part 340 further comprises a plurality of fourth air-providing molding parts 360 and fourth air passages 500D. Each of the fourth air passages 500D is connected to one of the fourth air-providing molding parts 360 through a joint. The fourth air-providing molding parts 360 are located on a surface of second molding part 340 facing the second sliding space D2. Each of the fourth air-providing molding parts 360 comprises a plurality of fourth outlets 400E. The fourth outlets 400D are arranged on a surface of the fourth air-providing molding part 360 facing the second sliding space D2. Thus, the fourth outlets 400D face the second sliding space D2. In other words, the fourth outlets 400D have an axial direction (such as Z axis). The axial direction of the fourth outlets 400D is orthogonal to the closing direction that the first molding part 310 and the second molding part 340 are closed.

In addition, according to the present embodiment, the mold opening process is divided into two stages, that is, a first mold opening stage and a second mold opening stage progressing in sequence. The first mold opening stage is a period between the first molding part 310 starting to separate from the second molding part 340 and the first molding part 310 being completely separated from the second molding part 340. The second mold opening stage is a period after the first molding part 310 has been completely separated from the second molding part 340.

When a forming mold 301 is at the first mold opening stage, that is, the first molding part 310 and the second molding part 340 are separated from each other until the second molding part 340 has exposed the first outlets 400A. At this time, a gap G1 is between the first molding part 310 and the second molding part 340. Although the second mold core 342 of the second molding part 340 still partially adheres to an outer side of the molding object P, the second molding part 340 has gradually emptied a space in the second recess 343. In addition to that, the first internal slide blocks 320 start to slide towards an opening direction (such as X axis) at this time to allow the first sliding spaces D1 to be formed in the first mold core 313 and expose the third outlets 400C in the first sliding spaces D1. The second internal slide blocks 350 start to slide towards the opening direction (such as X axis) to allow the second sliding spaces D2 to be formed in the second molding part 340 and expose the fourth outlets 400D in the second sliding spaces D2.

After that, the controller 600 initiates the cold air provider 200 to transmit the cold air C from the third outlets 400C to the first sliding spaces D1, and to transmit the cold air C from the fourth outlets 400D to the second sliding spaces D2 and the second recess 343 to cool two opposite surfaces of the molding object P so as to reduce the temperature of the surface of the molding object P and surfaces of the mold cores of the forming mold 301 more uniformly.

Figure 6:
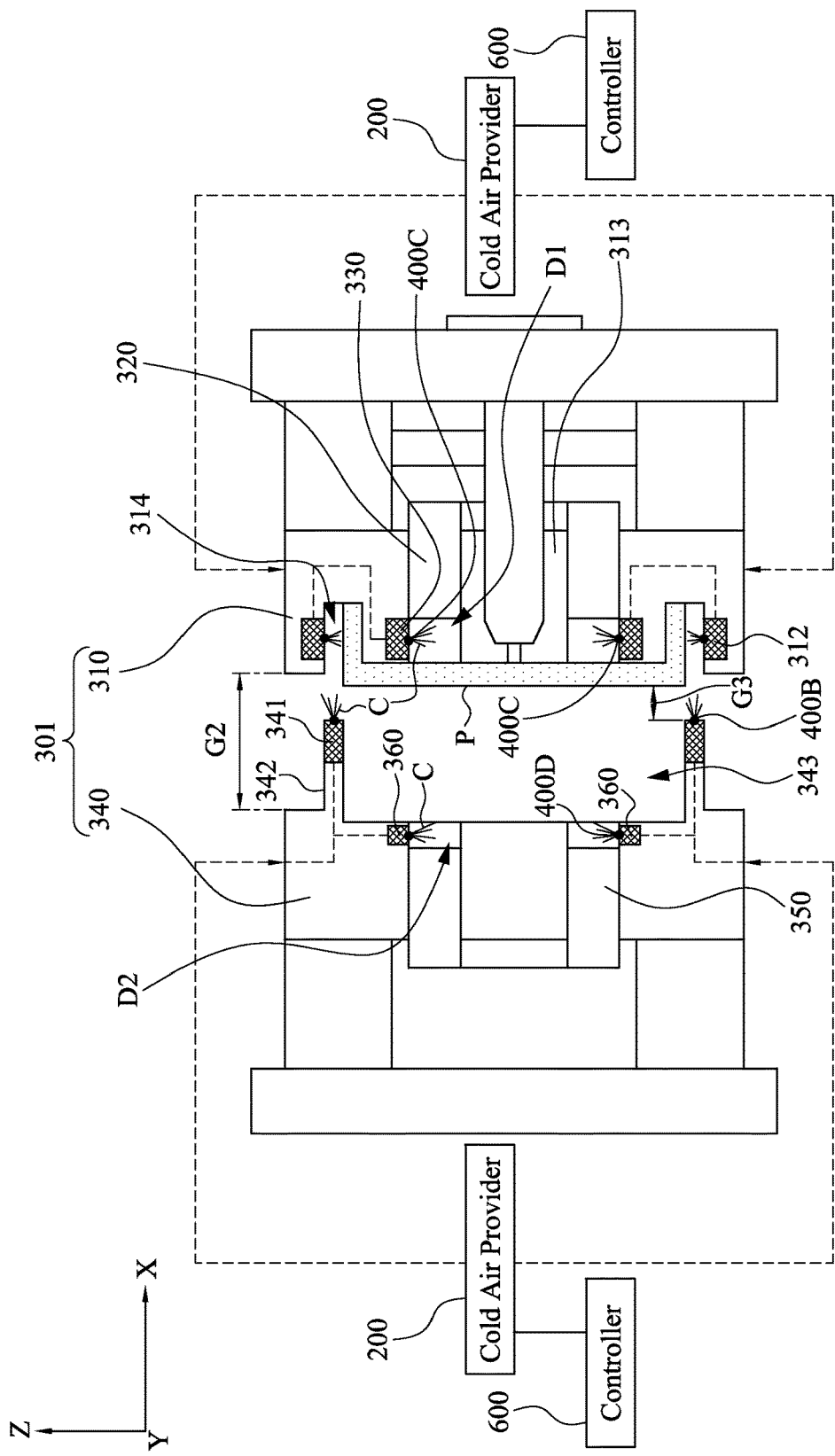
FIG. 6 depicts a cross-sectional view of the molding system in FIG. 5 at the second mold opening stage.

FIG. 6 depicts a cross-sectional view of the molding system in FIG. 5 at the second mold opening stage. When the forming mold 301 is at the second mold opening stage, that is, the first molding part 310 at least separates from the second molding part 340 completely until the second mold core 342 of the second molding part 340 completely leaves the first recess 314. At this time, a gap G2 is between the first molding part 310 and the second molding part 340. The gap G2 is larger than the gap G1. At this time, the controller 600 still initiates the cold air provider 200 to continue outputting cold air C to the first sliding spaces D1, the second sliding spaces D2, and the second recess 343. In one embodiment, a gap G3 between the surfaces of the second air-providing molding parts 341 and the surface of the molding object P may be from 1 mm to 2 mm, Or, even the gap G2 at the second mold opening stage may be from 1 mm to 2 mm. Hence, when the second mold core 342 completely leaves the first recess 314, the second outlets 400B of the second air-providing molding parts 341 on the second mold core 342 spray cold air C to the surface of the molding object P and the surface of the mold core of the forming mold 301 to reduce the temperature of the surface of the molding object P and the surface of the mold core of the forming mold 301 more uniformly.

Figure 7:
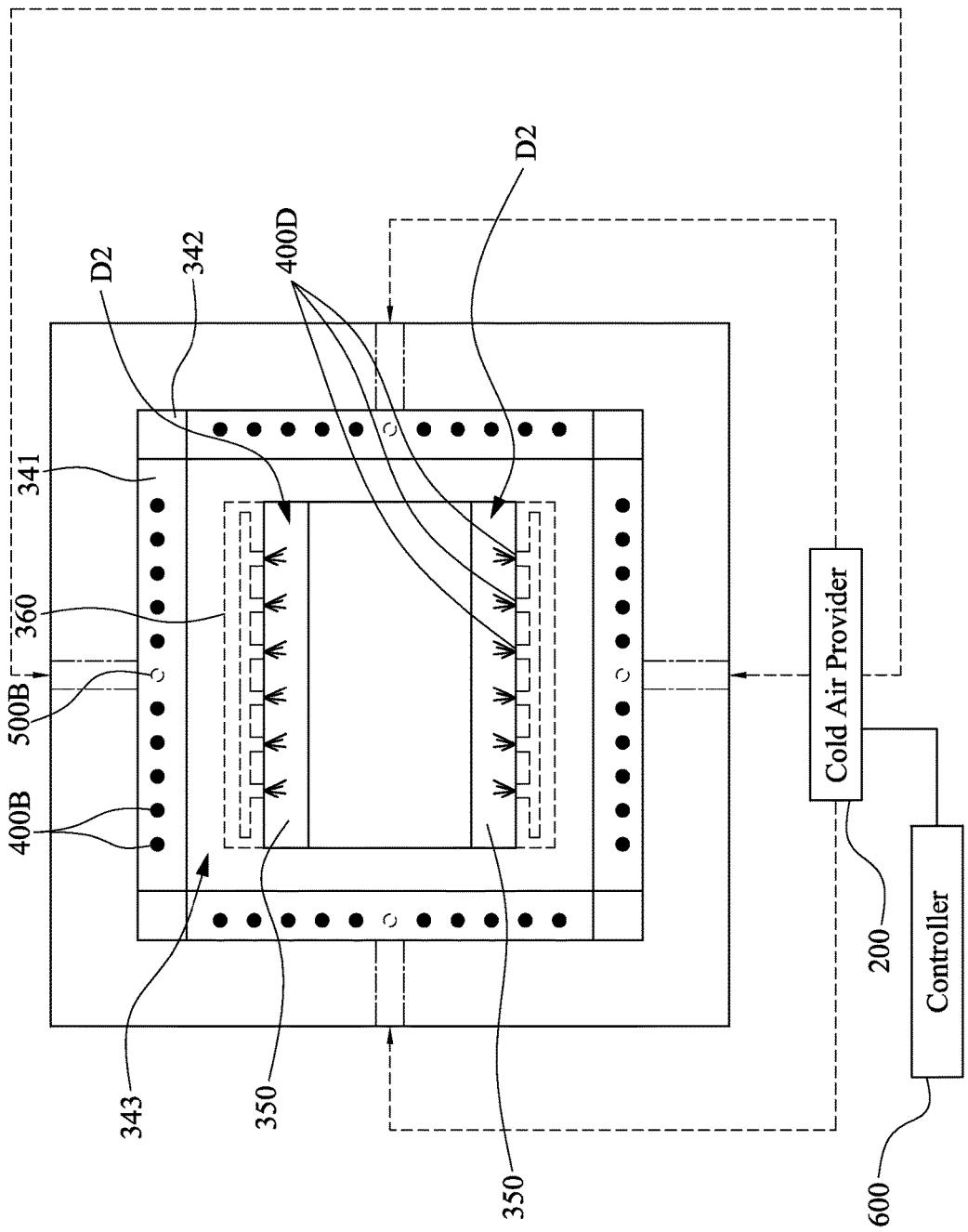
FIG. 7 depicts a front view of the second molding part in FIG. 5.

FIG. 7 depicts a front view of the second molding part 340 in FIG. 5. When the forming mold 301 is at the first mold opening stage (the gap G1), the third outlets 400C and the fourth outlets 400D blow out cold air to input the cold air to the first sliding spaces D1, the second sliding spaces D2, and the second recess 343 so as to cool the molding object P. When the forming mold 301 is at the second mold opening stage (the gap G2), cold air blown out by the third outlets 400C and the fourth outlets 400D can cool the surface of the molding object P more uniformly because the second air-providing molding parts 341 on two sides of the second molding part 340 are completely separated from the molding object P at this time.

As shown in FIG. 6 and FIG. 7, not only is the second recess 343 mutually surrounded by the second air-providing molding parts 341, but the third air-providing molding parts 330 are also disposed opposite to each other and between any two of the second air-providing molding parts 341. Thus, the fourth outlets 400D are allowed to spray cold air C to a surface of the molding object P back to the first molding part 310 so as to effectively cooling a specific region of the molding object P.

It should be understood that a temperature of the cold air according to the present invention is preferably lower than zero degree Celsius. However, the present invention is not limited in this regard. A type of the cold air provider according to the present invention is not limited, for example, a room temperature air cooling device which is an air compressor, a refrigerated air dryer, a vortex tube device, or a low temperature nitrogen generator comprising an atmospheric pressure liquid nitrogen storage barrel, a piece of nitrogen centralized equipment, a nitrogen tank connection guide tube and valve. However, the present invention is not limited in this regard.

For example, when the cold air provider is a low temperature nitrogen generator, the cold air is supplied by an atmospheric pressure liquid nitrogen storage barrel. The atmospheric pressure liquid nitrogen storage barrel is first connected to the guide tube and valve, and is connected a nitrogen collection tank, nitrogen is then transmitted from the nitrogen collection tank to the first air passages through a guide tube, and is thereafter distributed to the first outlets of the first air-providing molding parts to cool the molding object. Because liquid nitrogen has a considerably low temperature at atmospheric pressure, it will vaporize rapidly once contacting with the surface of the connection guide tube, and absorb heat when passing through the air passages so as to carry away a huge amount of heat energy of the mold simultaneously.

For another example, when the cold air provider is a vortex tube device, the vortex tube device compresses air directly so that the compressed air rotates spirally to form high-speed refrigerated (such as −18° C.) cyclone with a negative center pressure. Thus, the high-speed cyclone directly blows the molding object through the outlets at a high speed, such that the surface of the molding object and the surfaces of the mold cores of the forming molding can be quickly chilled.

In one embodiment, when there are a plurality of forming molds, a manifold may be utilized to switch to the mold to which the cold air provider transmits cold air.

With additional reference to FIG. 1, the molding system 100 further comprises a preheat mechanism. The preheat mechanism comprises a high frequency machine 700 and a high frequency induction heater 710. The high frequency machine 700 is electrically connected to the high frequency induction heater 710. When the molding object P is formed and before the first molding part 310 and the second molding part 340 are closed, the high frequency induction heater 710 is brought between the first molding part 310 and the second molding part 340 so that the high frequency machine 700 drives the high frequency induction heater 710 to preheat inner surface(s) of the first molding part 310 or/and the second molding part 340. However, the present invention is not limited in this regard, the preheat mechanism may be omitted.

Since the high frequency induction heater 710 will generate a magnetic field when passing by an electric current, the high frequency induction heater 710 can centralize eddy currents on the surfaces of the mold cores of the first molding part 310 and the second molding part 340 within a very short time. The heat generated comes from electric resistance heat and a magnetic hysteresis loss. Because the high frequency induction heater 710 directly heats the inner surface(s) of the mold core(s) of the first molding part 310 or/and the second molding part 340, the inner surface(s) of the mold core(s) of the first molding part 310 or/and the second molding part 340 are instantaneously heated. For example, a temperature of the inner surface(s) of the mold core(s) can rise up to 120° C. within five seconds after the inner surface(s) of the mold cores are heated by the high frequency induction heater 710.

Figure 8:
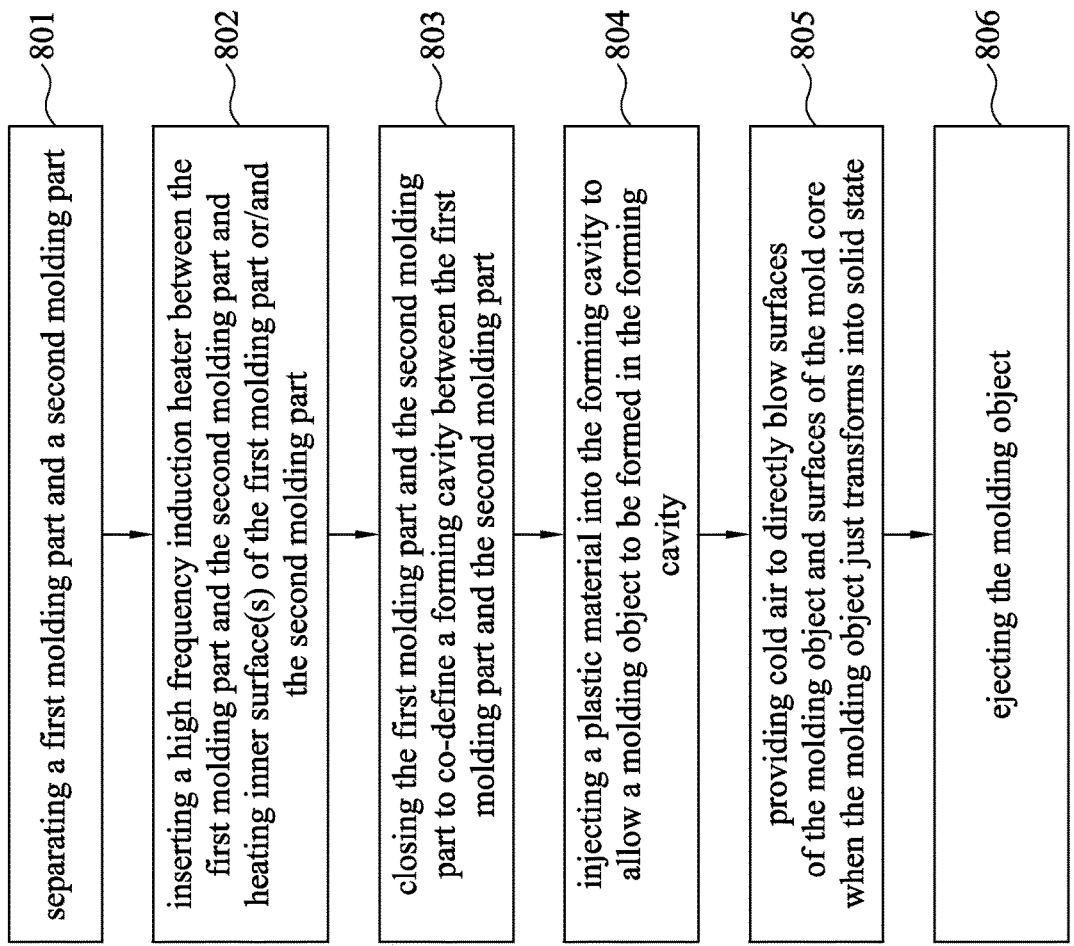
FIG. 8 depicts a flow chart of a method for directly gas-cooling a molding object according to another embodiment of this invention.

FIG. 8 depicts a flow chart of a method for directly gas-cooling a molding object P according to another embodiment of this invention. According to the present invention, the method for directly gas-cooling the molding object P comprises:

In step 801, separating a first molding part and a second molding part. In step 802, inserting a high frequency induction heater into a gap between the first molding part and the second molding part and heating inner surface(s) of the first molding part or/and the second molding part. In step 803, closing the first molding part and the second molding part and co-define a forming cavity between the first molding part and the second molding part. In step 804, injecting a plastic material into the forming cavity to allow a molding object to be formed in the forming cavity. In step 805, providing cold air to directly blow surfaces of the molding object and surfaces of the mold core when the molding object in the forming cavity just transforms into solid state. In step 806, ejecting the molding object.

As shown in FIG. 1, in step 802, initiate the high frequency machine 700 to drive the high frequency induction heater 710 to enter into the gap between the first molding part 310 and the second molding part 340 so as to heat the inner surface(s) of the first molding part 310 or/and the second molding part 340. In step 804, as shown in FIG. 1 and FIG. 2, initiates a plastic injection unit 900 of an injection molding machine so that the plastic injection unit 900 injects the plastic material R (such as molten resin) into a space in the forming cavity 380 through a plastic passage 311 inside the first molding part 310 until the plastic material R fills up the space in the forming cavity 380. The plastic material R filling up the forming cavity 380 can form a molding object P. At the same time, the pressure of the plastic material R filling up the forming cavity 380 is held and start initiating the cold air provider 200.

In step 805, as shown in FIG. 2 and FIG. 3, once the controller 600 learns that a high temperature of the molding object P in the forming cavity 380 is just reduced to solid transition point (such as glass transition point Tg) and the molding object P transforms into solid state (glassy region), it is a time point at which the first molding part 310 starts to be separated from the second molding part 340 according to the present embodiment. During the period between the first molding part 310 starting to be separated from the second molding part 340 and the first molding part 310 and the second molding part 340 being separated completely, that is at the first mold opening stage (gap G1), only the first outlets 400A facing the molding object P are exposed and the controller 600 drives the cold air provider 200 to provide cold air to surfaces of the molding object P and surfaces of the mold core of the forming mold 300 through the first outlets 400A so as to reduce temperatures of the molding object P and the forming mold 300. When the first molding part 310 has been completely separated from the second molding part 340, that is at the second mold opening stage (gap G2), the controller 600 drives the cold air provider 200 to provide cold air to a surface of the molding object P and a surface of mold core of the forming mold 300 through the second outlets 400B facing the molding object P so as to reduce the temperatures of the molding object P and the forming mold 300.

It should be understood that when the first molding part 310 and the second molding part 340 are completely separated, cold air provided by the first outlets 400A is not limited to be continuous or stopped.

When compared with the prior art in which the mold is not opened until the molding object in the forming cavity is cooled by water channels in the mold core indirectly, the mold is opened when the molding object in the forming cavity just transforms into solid state (glassy region) according to the present invention. By blowing cold air towards the surface of the molding object and the surfaces of the mold cores of the forming mold directly, the time for opening the mold is brought ahead effectively.

It should be understood that a type of the forming mold according to the present invention is not limited, for example, it may be a mold for injection molding or a mold for thermoforming. However, the present invention is not limited in this regard. Although the above-mentioned process is an injection molding process, the present invention is not limited in this regard. A thermoforming process can also follow the above process. In addition, although each of the outlets in the drawings is presented by a black dot, it is not intended to limit the appearance, position, or number of the outlets.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A molding system for directly gas-cooling a molding object, comprising:

a cold air provider;

a first molding part comprising a recess, a mold core located in the recess, and at least one first internal slide block slidably embedded in the mold core and forming a first sliding space in the mold core after sliding;

a second molding part, the first molding part and the second molding part being detachably closed to define a forming cavity between the first molding part and the second molding part, the forming cavity being used to form a molding object therein, the molding object being allowed to be adhered to the mold core;

at least one air-providing molding part located on the first molding part, the air-providing molding part having a plurality of outlets facing the recess, wherein, when the first molding part and the second molding part are closed to block a communication between the outlets and the recess, the second molding part is located between the outlets and the mold core, and when the first molding part is separated from the second molding part, the outlets communicate with the recess;

at least one first additional air-providing molding part located on the mold core, the first additional air-providing molding part having a plurality of first additional outlets, the first additional outlets facing the first sliding space, wherein, when the first internal slide block is embedded in the first sliding space, the first internal slide block blocks a communication between the first additional outlets and the first sliding space, and when the first internal slide block retracts from the first sliding space, the first additional outlets communicate with the first sliding space;

at least one air passage connecting the cold air provider and the air-providing molding part; and a controller electrically connected to the cold air provider, wherein the controller drives the cold air provider to provide cold air to the molding object through the outlets after the molding object is formed in the forming cavity.

2. The molding system for directly gas-cooling the molding object of claim 1, further comprising a second additional air-providing molding part located on the second molding part, the second additional air-providing molding part having a plurality of second additional outlets which are located on a surface of the second additional air-providing molding part facing the first molding part, wherein, when the first molding part and the second molding part are closed, the second additional outlets are in the recess, and the first molding part blocks a communication between the second additional outlets and the recess, and the second additional outlets communicate with the recess when the first molding part is separated from the second molding part.

3. The molding system for directly gas-cooling the molding object of claim 2, wherein one of the first additional outlets and the second additional outlets have an axial direction, a closing direction that the first molding part and the second molding part are closed being orthogonal to or in parallel with the axial direction.

4. The molding system for directly gas-cooling the molding object of claim 1, wherein a plurality of the air-providing molding parts are located on the first molding part, the outlets of the air-providing molding parts mutually surround the mold core.

5. The molding system for directly gas-cooling the molding object of claim 1, further comprising:

at least one second additional air-providing molding part located on the second molding part, the second additional air-providing molding part having a plurality of second additional outlets, wherein the second molding part comprises:

an additional recess formed on a surface of the second molding part facing the first molding part; and at least one second internal slide block slidably embedded in a surface of the second molding part facing the additional recess and forming a second sliding space in the second molding part after sliding, the second additional outlets facing the second sliding space, wherein, when the second internal slide block is embedded in the second sliding space, the second internal slide block blocks a communication between the second additional outlets and the second sliding space, and when the second internal slide block retracts from the second sliding space, the second additional outlets communicate with the second sliding space.

6. The molding system for directly gas-cooling the molding object of claim 5, wherein one of the first additional outlets and the second additional outlets have an axial direction, a closing direction that the first molding part and the second molding part are closed being orthogonal to or in parallel with the axial direction.

7. The molding system for directly gas-cooling the molding object of claim 1, further comprising: a plurality of second additional air-providing molding parts located on the second molding part, each of the second additional air-providing molding parts having a plurality of second additional outlets, wherein the second molding part comprises an additional recess, the additional recess being formed on a surface of the second molding part facing the first molding part;

wherein the second additional outlets of the second additional air-providing molding parts mutually surround the additional recess.

8. The molding system for directly gas-cooling the molding object of claim 7, wherein one of the first additional outlets and the second additional outlets have an axial direction, a closing direction that the first molding part and the second molding part are closed being orthogonal to or in parallel with the axial direction.

9. The molding system for directly gas-cooling the molding object of claim 1, wherein the outlets have an axial direction, a closing direction that the first molding part and the second molding part are closed being orthogonal to or in parallel with the axial direction.

10. The molding system for directly gas-cooling the molding object of claim 1, wherein the cold air provider is an air compressor, a refrigerated air dryer, a low temperature nitrogen generator, or a vortex tube device.

11. The molding system for directly gas-cooling the molding object of claim 1, wherein the first additional outlets have an axial direction, a closing direction that the first molding part and the second molding part are closed being orthogonal to or in parallel with the axial direction.

12. A molding system for directly gas-cooling a molding object, comprising:

a cold air provider;

a first molding part, including a recess, a mold core located in the recess, and at least one internal slide block slidably embedded in the mold core and forming a sliding space in the mold core after sliding;

a second molding part, the first molding part and the second molding part being detachably closed to define a forming cavity between the first molding part and the second molding part, the forming cavity being used to form a molding object therein, the molding object being adherable to the mold core;

at least one air-providing molding part located on the mold core, the air-providing molding part having a plurality of outlets facing the sliding space;

at least one air passage connecting the cold air provider and the air-providing molding part; and a controller electrically connected to the cold air provider, wherein the controller drives the cold air provider to provide cold air to the molding object through the outlets after the molding object is formed in the forming cavity;

wherein when the internal slide block is embedded in the sliding space, the internal slide block blocks a communication between the outlets and the sliding space; and wherein when the internal slide block retracts from the sliding space, the outlets communicate with the sliding space.

* * * * *